(No Model.)
J. T. NELSON & R. F. KERR.
ENVELOP OPENER.
No. 574,563.  Patented Jan. 5, 1897.
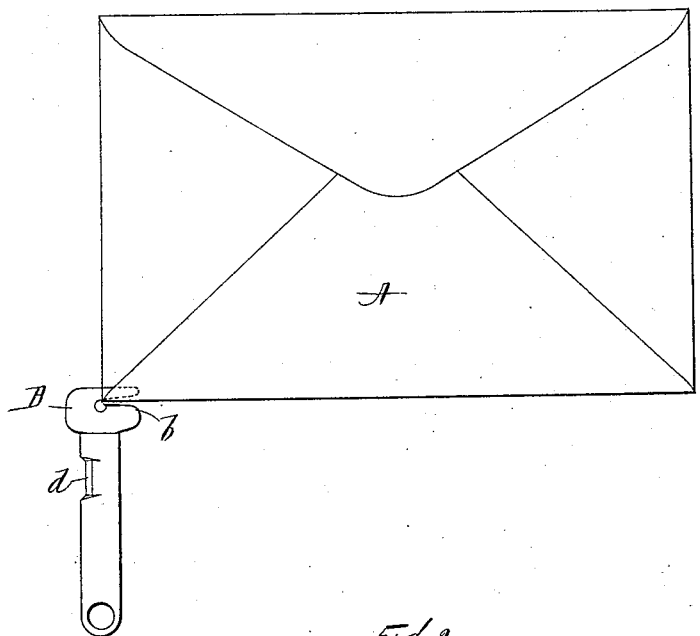
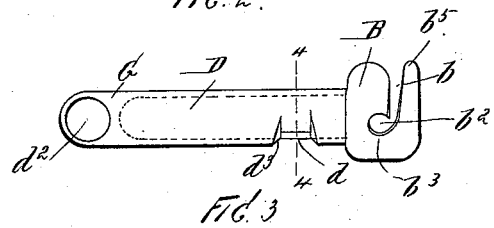
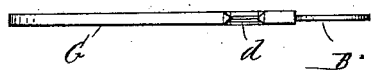

UNITED STATES PATENT OFFICE.

JOHN T. NELSON AND ROBERT FLOYD KERR, OF BROOKINGS, SOUTH DAKOTA.

ENVELOP-OPENER.

SPECIFICATION forming part of Letters Patent No. 574,563, dated January 5, 1897.

Application filed February 28, 1896. Serial No. 581,104. (No model.)

*To all whom it may concern:*

Be it known that we, JOHN T. NELSON and ROBERT FLOYD KERR, citizens of the United States, and residents of Brookings, in the county of Brookings and State of South Dakota, have invented certain new and useful Improvements in Envelop-Openers, of which the following is a specification, reference being had to the accompanying drawings, forming a part thereof, in which similar letters of reference indicate corresponding parts.

This invention relates to envelop-openers, pencil-sharpeners, &c.; and the object thereof is to provide a combination device of this class which may be carried in the pocket and connected with a key-ring, if desired, a further object being to provide a combined envelop-opener and pencil-sharpener which is simple in construction and operation and comparatively inexpensive.

The invention is fully disclosed in the following specification, of which the accompanying drawings form a part, in which—

Figure 1 is a side view of an envelop, showing also our improved envelop-opener and the method of its operation; Fig. 2, a side view of the latter; Fig. 3, an edge view thereof, and Fig. 4 a section on the line 4 4 of Fig. 2.

In the drawings forming part of this specification, A represents an ordinary envelop, and in the practice of our invention we provide an envelop-opener and pencil-sharpener consisting of a head B, which is oblong in form and provided at one side with a slot $b$, which communicates with a cental opening $b^2$, and the outer side of the central opening $b^2$ is provided with a cutting edge, as shown at $b^3$, and the operation of this form of construction will be readily understood from the foregoing description when taken in connection with the accompanying drawings. The prong or projection $b^5$ (the point of which is blunt) of the head B, which is formed by the slot $b$, is inserted at one corner of the envelop, and the head B is carried along one edge, thus cutting or separating the sides of the envelop, as will be readily understood.

The head B of the envelop opener is provided with a shank or blade D, which is shown in dotted lines in Fig. 2 and in section in Fig. 4, and said shank or blade is provided with a cutting edge $d$, and we also preferably employ a cover or casing G, which is of the same general form as the shank or blade D and one end of which is open and adapted to receive said shank or blade, and the other end of which is provided with an eye or aperture $d^2$.

Formed in the casing G, adjacent to the head B of the cutter, is an oblong notch or recess $d^3$, through which the cutting edge of the shank or blade D projects, as clearly shown in Figs. 1, 2, and 3, and this cutting edge is adapted to serve as a pencil-sharpener, and the operation thereof will be readily understood from the foregoing description when taken in connection with the accompanying drawings.

The pencil-sharpener is used as an ordinary knife, and the device may be connected with a key-ring, and the casing G is not absolutely essential, as will be apparent; but if such casing is not employed the shank or blade D will be formed longer, and the edge thereof will be provided with a notch or recess which corresponds with the notch or recess $d^3$, formed in the casing, said notch or recess being oblong in form, and the inner portion thereof being provided with a cutting edge.

This device is simple in construction and operation and perfectly adapted to accomplish the result for which it is intended, and it is evident that changes in and modifications of the construction herein described may be made without departing from the spirit of our invention or sacrificing its advantages.

Having fully described our invention, we claim as new and desire to secure by Letters Patent—

As an improved article of manufacture, a combined envelop-opener and pencil-sharpener, consisting of a casing, one side of which is cut away to form a notch or opening, a flat shank therein having a cutting edge, a portion of which projects through said notch, an oblong head formed integrally to said shank and extending in the front and rear and beyond the lines of its edges, said head being provided with a slot in one side which opens outwardly by means of which a prong is formed for the insertion into an envelop, said slot connecting at its inner end with a circular opening in the head provided with a cutting edge and said shank being adapted to slide within said casing, substantially as shown and described.

In testimony that we claim the foregoing as our invention we have signed our names, in presence of the subscribing witnesses, this 21st day of February, 1896.

JOHN T. NELSON.
ROBERT FLOYD KERR.

Witnesses:
WILLIAM H. CORNELL,
CLINTON T. DOUGHTY.